United States Patent
Loewenthal

[19]

[11] Patent Number: 6,035,975
[45] Date of Patent: Mar. 14, 2000

[54] WHEEL LOCK ASSEMBLY

[75] Inventor: Howard L. Loewenthal, Chesterland, Ohio

[73] Assignee: Invacare Corporation, Elyria, Ohio

[21] Appl. No.: 09/245,789

[22] Filed: Feb. 5, 1999

Related U.S. Application Data

[63] Continuation-in-part of application No. 08/943,561, Oct. 3, 1997, abandoned
[60] Provisional application No. 60/027,810, Oct. 4, 1996.

[51] Int. Cl.⁷ ..................................................... B60T 1/04
[52] U.S. Cl. ..................... 188/2 F; 280/242.1; 280/304.1
[58] Field of Search ................... 188/2 F, 74; 280/242.1, 280/250.1, 304.1

[56] References Cited

U.S. PATENT DOCUMENTS

| | | | |
|---|---|---|---|
| 4,570,756 | 2/1986 | Minnebraker et al. | 188/2 F |
| 4,749,064 | 6/1988 | Jinno et al. | 188/2 F |
| 4,887,830 | 12/1989 | Fought et al. | 188/2 F |
| 4,987,978 | 1/1991 | Jungersen | 188/2 F |
| 5,174,418 | 12/1992 | Le et al. | 188/2 F |
| 5,346,039 | 9/1994 | Pfisterer | 188/2 F |
| 5,355,977 | 10/1994 | Kuschall | 188/2 F |
| 5,358,266 | 10/1994 | Roth et al. | 188/2 F |
| 5,472,066 | 12/1995 | Schillo et al. | 188/2 F |

*Primary Examiner*—Christopher P. Schwartz
*Attorney, Agent, or Firm*—Hudak & Shunk Co., L.P.A.

[57] ABSTRACT

The wheel lock assembly includes a housing that is either integrally formed on a frame, or provided as a separate component for adjustable mounting on the frame. The housing includes a circular opening that receives a disk that rotates relative to the housing. A handle is either integrally formed with the disk or, alternately, secured to the disk as a separate component, to selectively rotate the disk relative to the housing. An actuating shoe is pivotally mounted to the housing and includes a cam opening that cooperates with a pin secured to the disk at a position spaced from the central axis of rotation of the disk to convert the rotational movement of the handle and disk into translational movement of the shoe. This allows the shoe to be moved between locked and unlocked positions relative to the wheel of a wheeled apparatus such as a wheelchair, patient transport, stroller, or the like. The cam opening may also adopt alternative configurations to vary the travel of the shoe as desired.

14 Claims, 4 Drawing Sheets

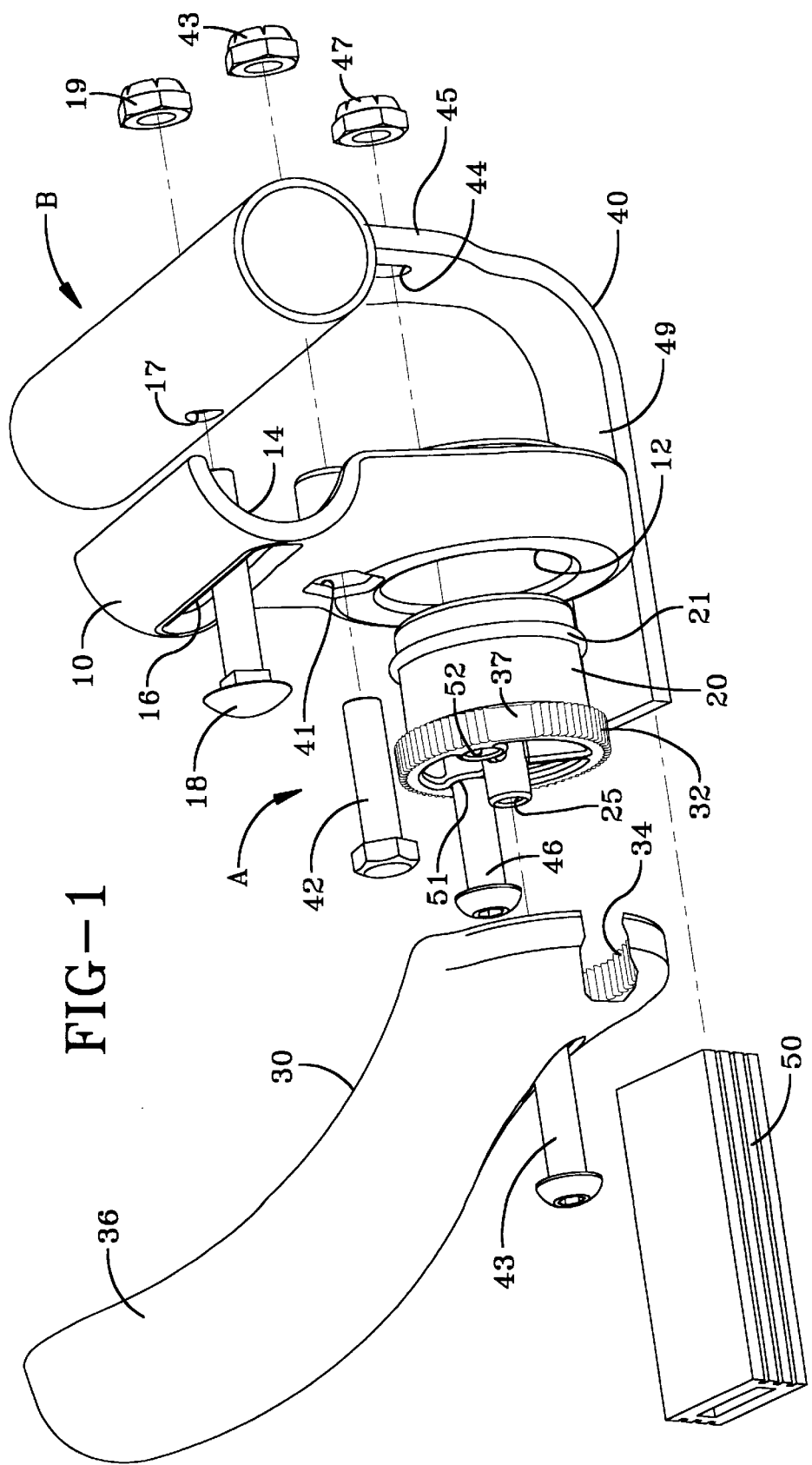

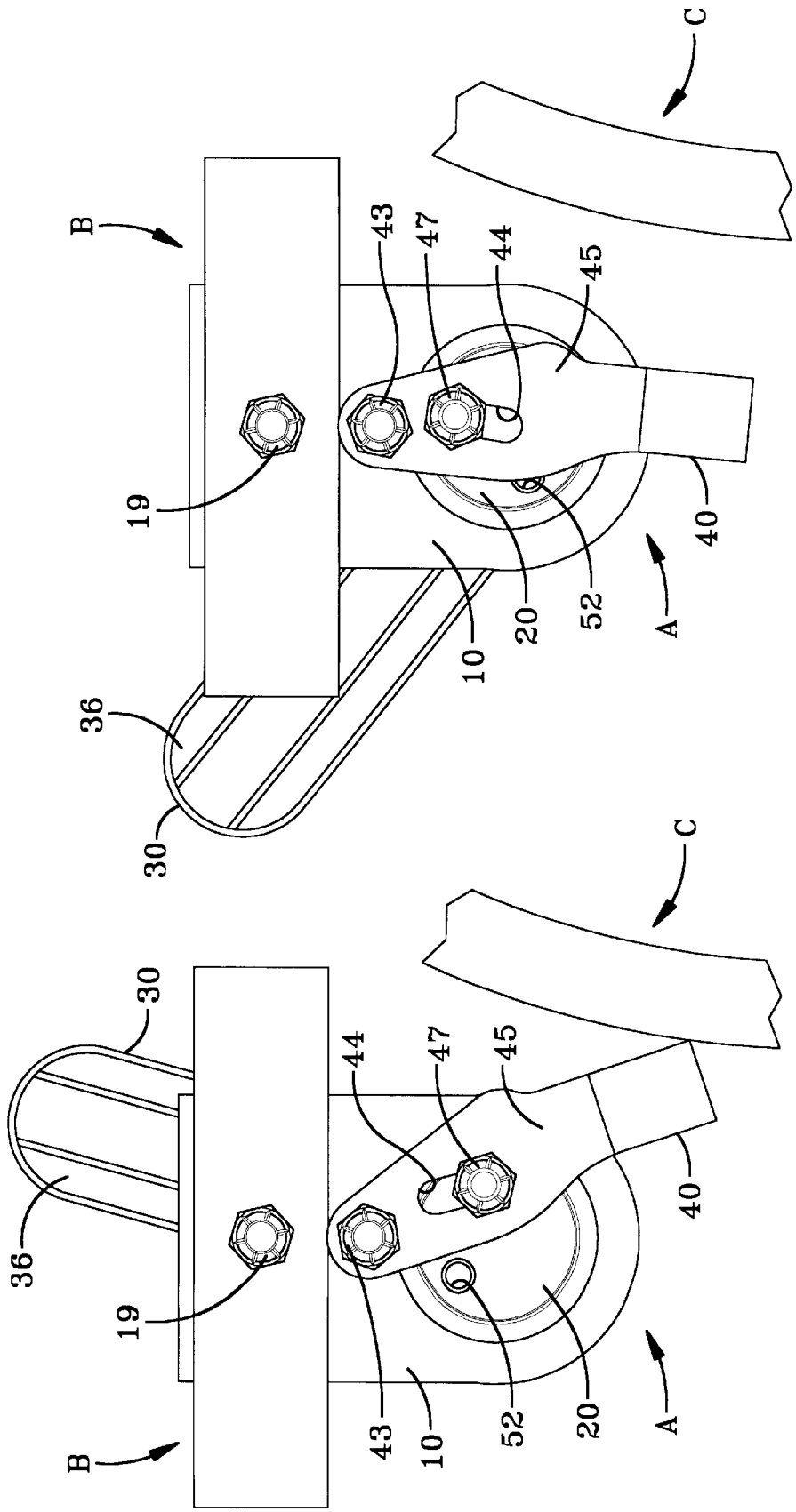

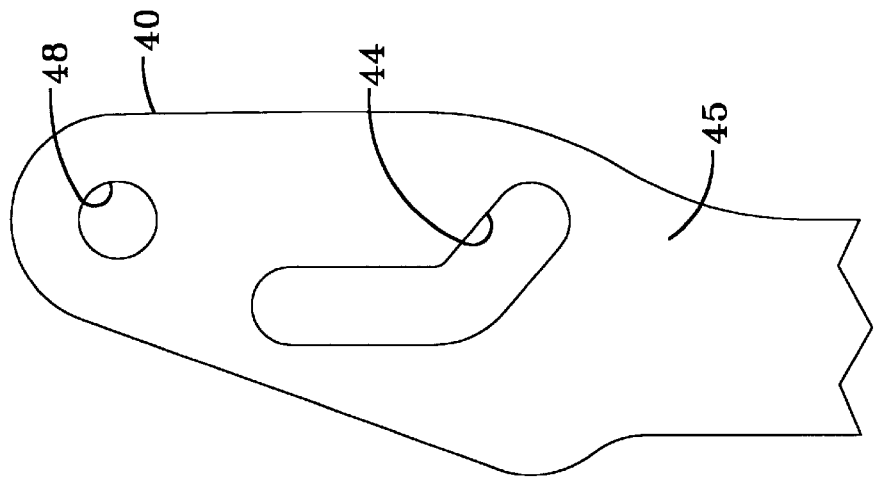
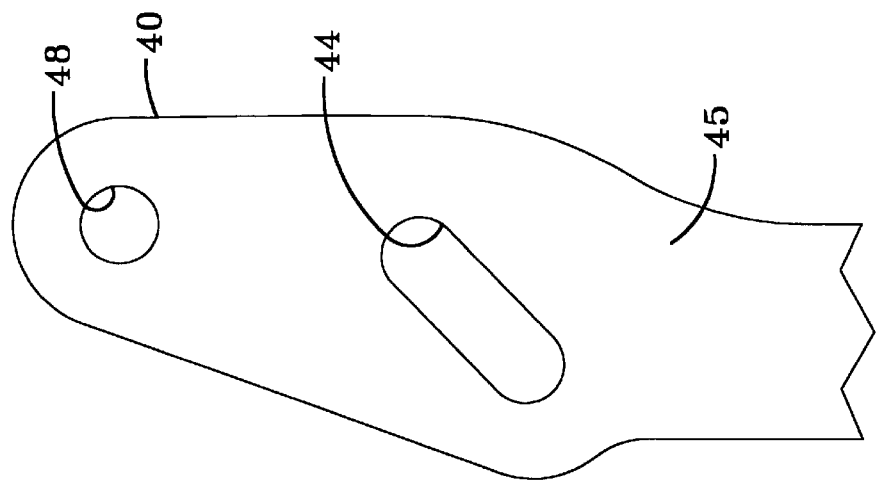
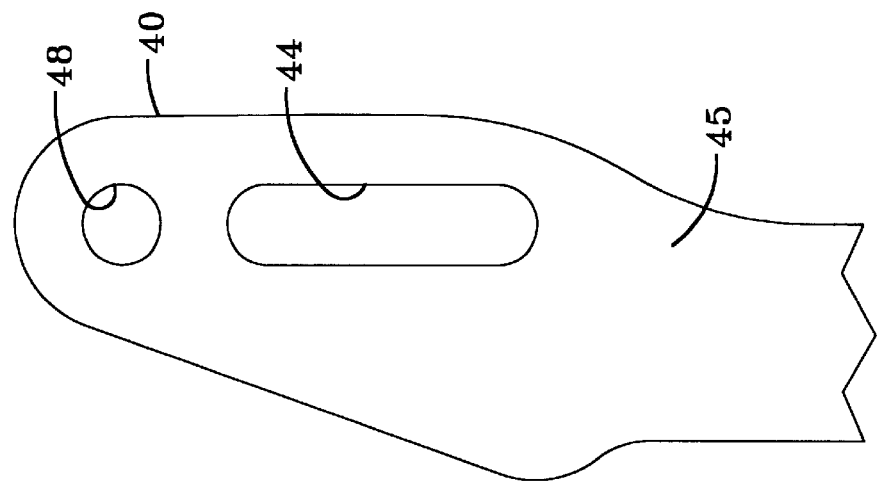

WHEEL LOCK ASSEMBLY

CROSS REFERENCE

This is a continuation-in-part of application Ser. No. 08/943,561, filed Oct. 03, 1997, abandoned which in turn claims priority from U.S. provisional patent application Ser. No. 60/027,810; filed Oct. 4, 1996 entitled Wheel Lock Assembly.

BACKGROUND OF THE INVENTION

This invention pertains to a wheel lock assembly, particularly a manually actuated wheel lock assembly used on wheelchairs, patient transports, strollers, carts, and the like. For example, large diameter wheels on wheelchairs often include a wheel lock that is typically a four bar linkage assembly. An actuating handle is used in a push-to-lock or a pull-to-lock arrangement to selectively move or pivot a shoe into selective engagement with the periphery of a pneumatic, solid, or semi-solid tire mounted on the wheel. The shoe is actuated or pressed into the outer surface of the tire, slightly deforming it to provide sufficient holding force against rotation.

Known four bar linkage assemblies, however, require a number of components or parts. For example, four fasteners are often used to interconnect the links and include individual bearings associated with each fastener to provide selective movement between the link arms of the linkage assembly. This large number of components becomes labor intensive to manufacture, even though some of the assembly operations may be automated.

Moreover, the action of these prior art wheel lock assemblies is not as smooth as desired. Pin joint problems are often associated with the four bar linkage assembly and, in addition to the difficulties of assembly, is not easy to adjust. The articulating points between the separate links also present a number of potential pinch points where an operator's fingers can be inadvertently pinched.

Further, this type of conventional wheel lock assembly is not conducive to alternative mounting arrangements, different size wheelchairs, nor does it maintain the maximum holding pressure once it passes the over-center position. Rather, a four bar linkage assembly has a decreased holding force once it passes the over-center position. This conventional wheel lock design is also not easily converted between push-to-lock and pull-to-lock arrangements.

Thus, the present invention is deemed to meet these and other objectives that overcome the various problems noted above.

SUMMARY OF THE INVENTION

According to the present invention, a wheel lock assembly is formed from a limited number of parts that eliminates the complexity of prior, known devices and provides a smooth operating mechanism. It includes a housing or mounting arrangement that has a circular recess or opening adapted to receive a disk therein. An actuating handle is secured to the disk for rotation between locked and unlocked positions. A shoe is pivotally mounted to the housing and operatively associated with the disk so that rotation of the disk results in travel of the shoe between locked and unlocked positions.

According to another aspect of the invention, the housing may be integrally formed with the frame structure to which it is mounted. Alternatively, the housing may include means for adjusting the housing relative to a frame to selectively position the wheel lock assembly at a desired location.

According to yet another aspect of the invention, the actuating handle and the disk may be keyed together or, alternatively, formed as an integral unit.

According to still another aspect of the invention, the shoe is operatively connected to the disk via an elongated groove. The groove may adopt various configurations to vary the travel of the shoe and cooperates with a pin extending from the disk at a location spaced from the axis of rotation of the disk.

A primary advantage of the invention resides in a wheel lock assembly formed from a limited number of parts that eliminates the complexity of prior, known devices and provides a smooth operating mechanism.

Another advantage of the invention resides in the ability to form the components from different materials such as metal, plastic, or composites.

Still another advantage of the invention is the ease with which the assembly may be converted from a pull-to-lock arrangement to a push-to-lock arrangement, or vice versa, merely by changing the orientation of the actuating handle relative to the shoe, the location of the pin extending from the disk relative to the disk, and the shape of the elongated groove formed in the shoe.

Still another benefit of the invention resides in the ease in which the travel of the shoe for a selected amount of disk rotation can be altered by changing the configuration of the slot to a cam-shape or arcuate slot arrangement.

Still other advantages such as the light weight, low maintenance, minimization of the pin joints and high stresses associated therewith, reduction in the handle force when compared to a conventional design, ease of assembly, minimum part complexity, handle angle adjustment, and the elimination of pinch points are all associated with the present design.

BRIEF DESCRIPTION OF THE DRAWINGS

FIG. 1 is an exploded perspective view of the wheel lock assembly of the present invention, with portions broken away, and showing the manner of mounting of the assembly on a frame of the wheelchair shown in fragmentary form;

FIG. 3A is a view similar to FIGS. 2A and 2B, of a pull-to-lock second embodiment of the present invention, showing the wheel lock assembly in a locked position;

FIG. 3B is a view similar to FIG. 3A, but showing the wheel lock assembly in an unlocked position; and FIGS. 4A–C are views illustrating alternative slot configurations that may be incorporated into the shoe for varying the extent of travel thereof.

DETAILED DESCRIPTION OF THE PREFERRED EMBODIMENTS

The present invention may take form in various parts and arrangements of parts, which we described in detail in the following specification. The invention, however, is not to be limited to this particular configuration or arrangement of elements.

Figure 2B:
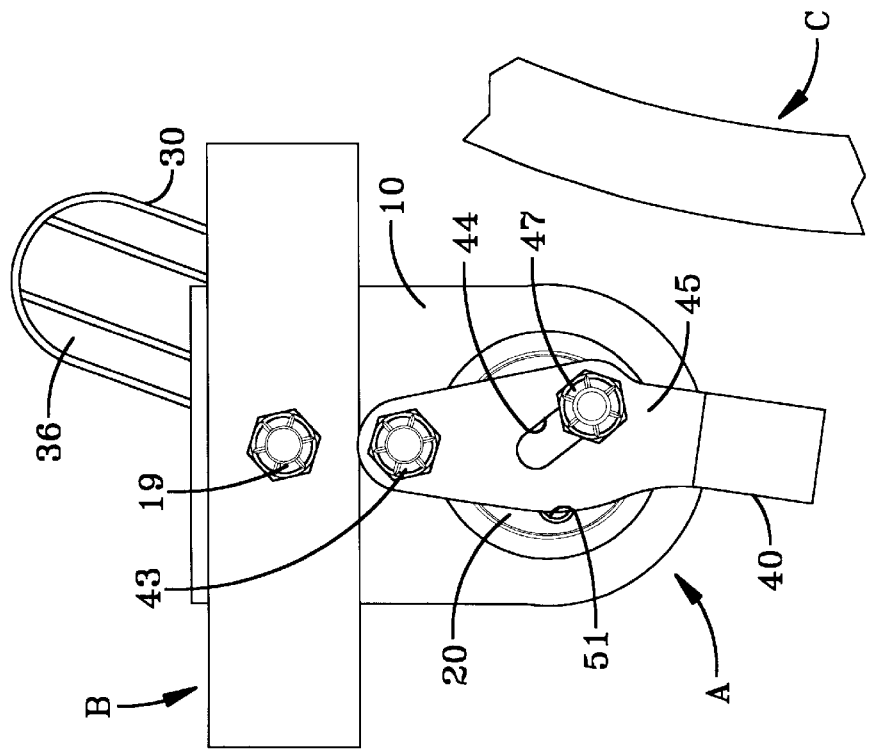
FIG. 2B is a view similar to FIG. 2A, but showing the wheel lock assembly in an unlocked position.
Figure 2A:
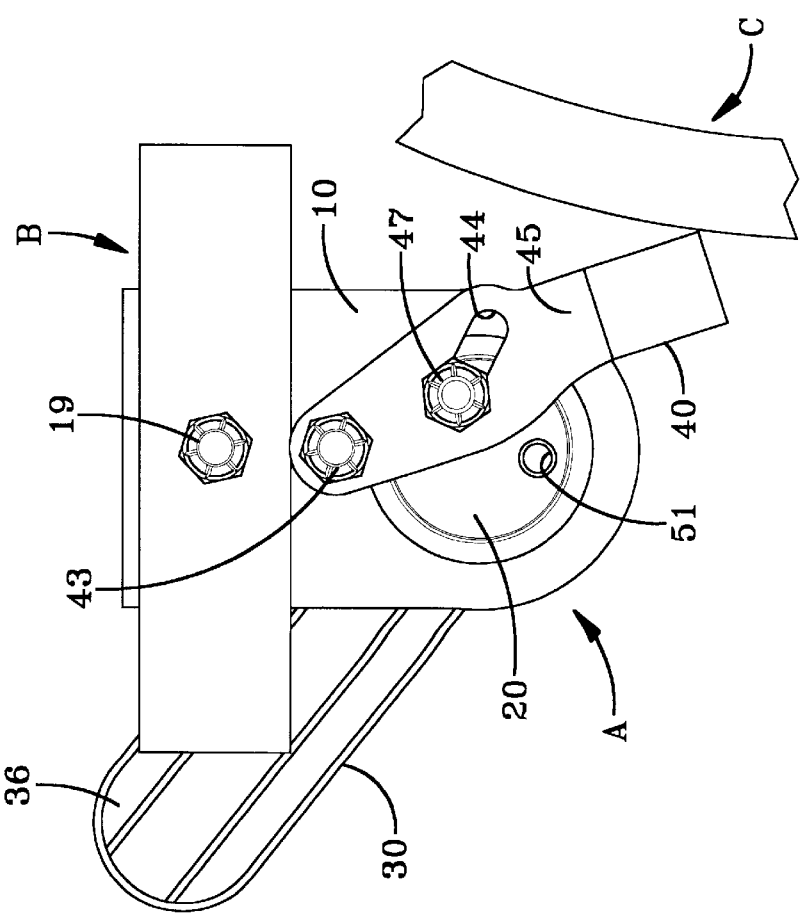
FIG. 2A is an inboard side elevational view of a push-to-lock first embodiment of the present invention, showing the wheel lock assembly in a locked position against the wheel of a wheelchair shown in fragmentary form.

Turning first to FIGS. 2A and 2B, a preferred first embodiment wheel lock assembly A is shown mounted to a frame component such as a tubular member B to position the wheel lock assembly adjacent a wheel C. For purposes of this description the frame component is a tubular frame member commonly used in wheelchairs, although it will be appreciated that the frame component need not be a tubular structure but can adopt a wide variety of frame configurations. Likewise, the illustrated wheelchair wheel C is but one use of preferred wheel lock assembly A. The present invention may also be used with other wheeled apparatus such as patient transports, strollers, carts, etc., or as part of a grade aid or hill holder assembly, such as shown and described in U.S. Pat. No. 4,887,830, commonly assigned to the owner of the present application.

First embodiment wheel lock assembly A includes, as best shown in FIG. 1, a housing 10 or mounting bracket that includes a circular recess or opening 12 therein. The housing may also include an integrally formed means of attaching the housing, such as an inwardly curved recess 14 formed in an inboard face of the housing and adapted to conform to the periphery of a tubular frame member B. Of course, other attachment means configurations could also be considered. In addition, the preferred mounting arrangement is adapted for adjustable mounting of the housing on the frame. For example, an elongated slot or opening 16 may be provided in the housing adjacent the recess and adapted to receive a fastener, such as one or more bolts 18, that passes through the slot, a pair of aligned openings 17 (only one shown) formed in frame B, and is secured in place by a cap nut 19. Elongated opening 16 allows fore-aft adjustment of the housing along the frame.

It will also be recognized that housing 10 could be integrally formed as a part of the frame structure. For example, if tubular member B is formed of a composite material structure, housing 10 could be easily formed as an integral portion thereof. According to the presently preferred arrangement, though, housing 10 is a separate member that is adjustably fastened to the frame component.

A second major component of wheel lock assembly A is a disk 20. Disk 20 may also be formed from a variety of materials such as metal, plastic, or composites, or may even incorporate a self-lubricating material if so desired. The disk has a diameter slightly less than that of circular opening 12 in housing 10 so that it may be closely received therein for rotation relative to the housing. Preferably, disk 20 when received in opening 12 provides a substantially flush surface to reduce the potential for pinch points and also provide for a smooth operation of wheel lock assembly A; however, and as will be recognized from the preferred embodiments, portions of the disk may extend outwardly from the outboard surface of housing 10. Disk 20 may also include a feature such as an O-ring 21 interposed between the disk and housing 10 to exert a predetermined drag on the movement of wheel lock assembly A. Of course, the opposite result may be desired, i.e., facilitating smooth rotation of disk 20 by inserting a lubricant or forming the components from a lubricious material to provide for ease of actuation and deactuation of wheel lock assembly A via these relatively rotating surfaces.

An actuating handle 30 is shown as a third major component of wheel lock assembly A. It will be understood, however, that handle 30 may be integrally formed with disk 20, e.g. molded therewith, integrally secured thereto by welding, etc. Alternatively, handle 30 and disk 20 may be formed as separate elements, and then removably secured together in a desired angular relationship. For example, the periphery of a portion of disk 20 extending outwardly from housing 10 may be formed with serrations 32 to cooperate with an internal serrated surface 34 provided on handle 30. This provides for a keyed arrangement in which the angular relationship of a grasping portion 36 of handle 30 may be angularly altered relative to the disk. Moreover, one or more indexing surfaces 37 (only one shown) is provided on disk 20 adjacent to serrations 32 and on handle 30 adjacent to internal serrated surface 34. Indexing surfaces 37 enable coupling of only the appropriate right or left-hand handle 30 with its respective disk 20 to aid in speed of manufacturing assembly of the wheeled apparatus on which a pair of left and right-hand wheel lock assemblies A is incorporated.

As will also be appreciated, grasping portion 36 may adopt a wide variety of configurations that are easily grasped, conformed, or desired by the user. These ergonomic features have heretofore not been found in wheel lock assemblies. In addition, the handle may be formed from a wide variety of materials such as steel, or plastic that is molded or fabricated allowing for increased tactile sensation, visibility, or reducing the pressure contact with the user's hands. Likewise, the handle can be formed as a universal structure that can be used with either right-hand or left-hand assemblies or can be formed for individual handedness, i.e., specifically configured to conform to right-hand or left-hand use.

A shoe 40, as shown in the preferred arrangement, is a generally L-shaped member, and defines a fourth component of wheel lock assembly A. Shoe 40 is pivotally mounted to housing 10 via pin 42 and cap nut 43 adjacent one end of the shoe. Typically, pin 42 passes through an opening 41 formed in housing 10 at an area between enlarged opening 12 that receives disk 20 and opening 16 that enables mounting of the housing to frame B. Of course, still other pivotal mounting positions of shoe 40 can be used without departing from the scope or intent of the present invention. Shoe 40 includes a first portion 45 having an elongated opening 44, which is sometimes referred to as a cam opening, located inboardly from and adjacent to disk 20. As will be described further below, opening 44 can have an elongated generally linear configuration. Cam opening 44 may also have a curved configuration, to alter travel of the shoe upon rotation of the disk. Pin 42 also is passed through an opening 48 (FIGS. 4A, 4B and 4C) formed in first portion 45 of shoe 40, and is secured in place by cap nut 43.

Received through cam opening 44 is a fastener or pin 46 that operatively connects shoe 40 to disk 20. More particularly, pin 46 is passed through either a first or a second opening 51, 52, respectively, formed in disk 20 (FIGS. 1, 2A, 2B, 3A and 3B). The choice of opening depends on whether a pull-to-lock or push-to-lock operation of wheel lock assembly A is desired, and defines first (FIGS. 2A, 2B) and second (FIGS. 3A, 3B) embodiments of the present invention. Thus, pin 46 is located on disk 20 at a location offset from the central axis of rotation of the disk. Pin 46 also passes through cam opening 44 and is secured in place by a cap nut 47. In this manner, and depending on the angular position of handle 30 relative to disk 20, the choice of opening 51, 52 and the configuration of cam opening 44, shoe 40 translates or moves through an arcuate path about pivot pin 42. The limits of travel of shoe 40 are constrained by pin 46 engaging one end of cam opening 44 or the other (compare FIGS. 2A and 2B or 3A and 3B). The length of cam opening 44 is one way to control the extent of travel of shoe 40. It will also be recognized that the travel of shoe 40 can be controlled by limiting the extent of rotation of disk 20 relative to housing 10. For example, stop surfaces can be provided to limit the degree of rotation of disk 20 if so desired. Of course, still other structural arrangements to control the travel of shoe 40 can be used without departing from the scope and intent of the invention.

Shoe 40 also includes a second portion 49 (FIG. 1) or wheel engaging portion, which may be simply a rectangular bar, that extends in generally perpendicular fashion from first portion 45 of the shoe. Alternatively, second portion 49 may include a wheel or tire gripping surface such as serrated rubber boot 50 mounted on shoe second portion 49 as shown in FIG. 1.

As will also be appreciated, if handle 30 is formed separately from disk 20, the same fastener used to secure the handle to the disk may also be used to secure the shoe to the disk. Again, this reduces the number of component parts and overall complexity of the design. However, it will be understood by one of ordinary skill in the art that separate fasteners could be used as shown in the preferred embodiments without departing from the scope and intent of the present invention.

FIGS. 4A–C illustrate different configurations that cam opening 44 may adopt. For example, the shoe in FIG. 4A illustrates a substantially linear cam opening 44 that provides for one preferred range of travel of shoe 40 as disk 20 rotates. A more dramatically angled cam opening is shown in shoe 40 of FIG. 4B, while FIG. 4C illustrates a generally linear portion that merges into a curved linear or cam shape at one end to provide for increased travel of shoe 40 through the curved area. In any event, the present invention is intended to relate to these various configurations, depending on the desired extent of travel of shoe 40, and choice of push-to-lock or pull-to-lock embodiments as described hereinabove.

In operation, the handle is either pulled or pushed, depending on whether first embodiment shown in FIGS. 2A, 2B or second embodiment shown in FIGS. 3A, 3B is used, respectively, to rotate disk 20 in a clockwise or counter-clockwise direction as viewed from the inboard side. Since shoe 40 is operably connected to disk 20 via cam opening 44 and pin 46, rotation of the disk results in movement of the shoe from a locked position, where it pinches against wheel or tire C (FIGS. 2A and 3A), to an unlocked position (FIGS. 2B and 3B) where it is spaced from the periphery of the wheel. Likewise, movement of handle 36 in the opposite direction then reverses the procedure and brings the shoe into locking engagement with the periphery of the wheel.

By using the simplified design shown and described above, overall complexity of components and assembly is reduced. The operation of wheel lock assembly A is very smooth, and there is a relative ease of tension on all of the components. Moreover, even after shoe 40 has traveled past its over-center position, the holding force of the shoe against the periphery of wheel C is not substantially lessened as may be encountered with prior art arrangements.

Moreover, wheel lock assembly A of the present invention is easily suited for manufacture from alternative materials. This allows for a light-weight construction, whether it be a plastic, composite, or other material. Even if metal is still used, the present design results in low maintenance. The numerous pin joints of the prior art arrangement are eliminated along with the associated high stresses. Instead, the present arrangement can be easily assembled as well as easily maintained.

If desired, the angle of handle 30 can also easily be adjusted by removing the handle from disk 20, and rotating it to a new position. Likewise, the extent of travel of shoe 40 can be easily altered by incorporating a different profile cam opening 44 as a replacement shoe.

Also, it will be understood that the entire assembly can be unhanded, i.e., common parts used for both the right-hand and left-hand assemblies. Likewise, this structure is easily adapted to both push-to-lock and pull-to-lock types of arrangements merely by changing the disk opening, 51 or 52, respectively, through which pin 46 is passed, changing the orientation of handle 30 and choosing a shoe 40 having an appropriate cam opening. Thus, it is believed that new wheel lock assembly A can ultimately be manufactured at a reduced cost because of the limited number of components and simplified structure.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A wheel lock assembly for a wheeled apparatus having a wheel, the assembly comprising:

a housing adapted for mounting to an associated wheeled apparatus, said housing having a circular opening formed therein;

a disk received in the housing opening for selective rotation relative thereto;

a handle extending from said disk for selectively rotating the disk; and a shoe pivotally secured to the housing and operably connected to said disk for generally translational movement between a first position spaced from said wheel of said wheeled apparatus and a second position engaging the wheel of the wheeled apparatus in response to rotation of the disk.

2. The wheel lock assembly of claim 1, wherein the shoe is pivotally connected adjacent one end to the housing and further includes an elongated slot that receives a pin secured to the disk for moving said shoe between said first and second positions.

3. The wheel lock assembly of claim 2, wherein the pin is secured to the disk at a location spaced from the axis of rotation of said disk.

4. The wheel lock assembly of claim 1, wherein the handle is integrally formed with the disk.

5. The wheel lock assembly of claim 1, wherein the handle and the disk are keyed together.

6. The wheel lock assembly of claim 1, wherein the housing includes an elongated opening adapting the assembly for selective mounting locations on a frame of the associated wheeled apparatus.

7. The wheel lock assembly of claim 1, wherein the housing, the disk, and the handle each is formed from a molded material.

8. The wheel lock assembly of claim 1 further comprising a drag member interposed between the disk and the housing to impose a predetermined drag force on the relative rotation between said disk and said housing.

9. The wheel lock assembly of claim 8, wherein the drag member is an O-ring received on one of the disk and the housing that extends into frictional engagement with the other of said disk and said housing.

10. The wheel lock assembly of claim 3, wherein the angular orientation of the handle and the disk, the slope of the elongated slot, and the location of the pin relative to the axis of rotation of said disk, may be selectively altered to provide a push-to-lock and a pull-to-lock arrangement with generally the same components.

11. The wheel lock assembly of claim 1, wherein the shoe is pivotally connected adjacent one end to the housing and further includes an elongated slot that receives a pin secured to the disk for moving said shoe between the first and second positions, said slot having a predetermined angle for defining the extent of travel of the shoe.

12. The wheel lock assembly of claim 1, wherein the housing includes a curved recess adapted for receipt on an external surface of a tubular member associated with the wheeled apparatus.

13. The wheel lock assembly of claim 12, wherein the curved recess includes an elongated slot adapted to receive a fastener therethrough and allowing selective axial adjustment of the housing on the associated tubular member.

14. The wheel lock assembly of claim 1, wherein the shoe is pivotally connected adjacent one end to the housing and further includes an elongated slot that receives a pin secured to the disk for moving said shoe between the first and second positions, the extent of the shoe travel being controlled by the length of said elongated slot.

* * * * *